United States Patent Office 3,413,254
Patented Nov. 26, 1968

3,413,254
PRESSURE-SPRAYABLE ACRYLATE AND
METHACRYLATE POLYMERS SOLUBLE
IN PROPELLENT SOLVENT
Robert J. Gander, Whitehouse, N.J., assignor to Johnson
& Johnson, a corporation of New Jersey
No Drawing. Filed Apr. 9, 1964, Ser. No. 358,647
14 Claims. (Cl. 260—33.2)

The present invention relates to film-forming compositions and more particularly to pressure-sprayable solutions of film-forming polymers in which the film-forming polymer is in solution in a propellent solvent.

Because of the convenience of application, it is becoming increasingly popular to apply film-forming compositions from pressurized containers in the form of a fine mist or spray. The pressure is obtained by including in the container a highly volatile liquid that is a gas at ordinary room temperatures and pressures. Because of the insolubility of most film formers in such volatile propellent liquids, it has been the practice to first prepare a solution of the film-forming polymers in a conventional solvent, such for example as ethanol, ethyl acetate or acetone and then to charge the container with this solution and the propellent liquids to be used.

These solvents, however, are generally not readily released by the film-forming polymer and tend to evaporate relatively slowly. Propellents, on the other hand, although present as liquids in the pressurized container are gases at normal room temperature and, accordingly, evaporate rapidly. I have discovered that polymers of alkyl acrylates and polymers of alkyl methacrylates, both homopolymers and copolymers with other monomers, are generally soluble in certain propellents hereinafter called solvent propellents, where the alkyl group is not too small, i.e., where it contains at least four carbon atoms and where the alkyl acrylate or the alkyl methacrylate is present generally in amounts of at least 50% by weight of the polymer. However, all solutions of such acrylate and methacrylate polymers will not give satisfactory sprayable film-forming compositions.

It is an object of the present invention to prepare pressure-sprayable film-forming compositions wherein the solvent for the film-forming polymer is a propellent solvent.

It is a further object to prepare pressure-sprayable solutions of alkyl acrylate polymers and pressure-sprayable solutions of alkyl methacrylate polymers wherein the solvent for the polymer is one of the propellent liquids used and which when released from pressure through a dispensing valve in accordance with conventional aerosol technique will be dispensed in the form of a fine spray or droplets. Other objects and advantages of this invention will become apparent from the following description wherein are set forth by way of illustration and example certain embodiments of the same.

Although alkyl acrylate and alkyl methacrylate polymers and copolymers of the type herein described are found to be soluble in propellent solvents, a pressure-sprayable solution is not necessarily obtained. It has now been discovered, however, that sprayable compositions or solutions are obtained if the polymer used has a relative viscosity of not appreciably over 1.60 and is present in solution in the propellent or propellents present in a concentration of not appreciably above 6.0 weight percent. Where the relative viscosity of the polymer is appreciably greater than about 1.60 or where the concentration in the propellents is appreciably above 6.0 weight percent, a wet jet-like stream is obtained rather than a spray. Polymers with relative viscosities above about 1.60 can, in some instances, be made to spray satisfactorily by reducing their concentration in the propellent or propellents present to very low values such as 0.2 percent or less. When formulas of such low solids content are sprayed, they build up a film too slowly for practical use and are, therefore, not desirable. The concentration, generally, for practical purposes should not be below about 1.0 percent by weight.

The relative viscosity measurements are made at 30° C. on solutions of 1.000 gram of the polymer in 100 ml. of toluene solution.

The alkyl acrylate or alkyl methacrylate polymer films are applied by dispensing the same under pressure from a pressurized container wherein the polymer is present in the form of a solution in one of the propellents used. The propellent pressure in the container is preferably in the range of aobut 20 to 60 pounds per square inch gauge at a temperature of 75° F. Where the solvent propellent used will not by itself give a sufficiently high total pressure, other propellents are employed together with the solvent propellent to give the pressure desired.

Propellents

As previously indicated, in practicing the present invention the film-forming polymer is not dissolved in the usual resin solvents but is dissolved in a propellent solvent. The term propellent, as herein used, is used in the conventional sense. A propellent is, for example, defined in Aerosols: Science and Technology, Interscience Publishers, Inc., New York, N.Y., page 214, as "A liquefied gas with a vapor pressure greater than atmospheric pressure (14.7 p.s.i.a.) at a temperature of 105° F." This definition is sufficiently broad to include some liquids which, used alone, would not function as propellents, but in solution with selected liquefied gases make satisfactory pressurized systems. An example is methylene chloride whose boiling point is 105° F., at which temperature its vapor pressure equals atmospheric pressure. Thus it just falls within the limits of the definition. At ordinary room temperature, methylene chloride has a vapor pressure below atmosphereic pressure and cannot function as a propellent but, when dissolved in a liquid of high vapor pressure, it will give resultant pressures satisfactory for application to an aerosol system.

Propellent solvents are those propellents which are also solvents for the alkyl acrylate and alkyl methacrylate film-forming polymers used.

Propellent solvents generally available are trichlorofluoromethane ($CCl_3F$), generally referred to in the trade as Propellent 11; dichlorofluoromethane ($CHCl_2F$), generally referred to in the trade as Propellent 21; 1,1,2-trichloro-1,2,2-difluoroethane ($CCl_2FCClF_2$), generally referred to in the trade as Propellent 113; 1,1-difluoro-1-chloroethane ($CH_3CClF_2$), generally referred to in the trade as Genetron 142B; vinyl chloride ($CH_2=CHCl$); and dimethyl ether ($CH_3OCH_3$).

Of these propellent solvents, the one preferred and the one found to give the best results with the widest range of alkyl acrylate and alkyl methacrylate film-forming polymers is Propellent 11. Propellent 11 is a good solvent for the film-forming polymers and is readily released by the polymers after being dispensed from the pressurized container.

Where Propelelnt 11 is used as the propellent solvent, it is used together with another propellent, such as Propellent 12, in order to increase the pressure in the container to the desired 20 to 60 pounds per square inch gauge at 75° F. Propellent 12 is dichlorodifluoromethane ($CCl_2F_2$).

With respect to the other propellent solvents referred to, Propellent 21 is a good solvent for film-forming resins suitable for use in the present invention. This particular propellent solvent, however, has the characteristic that it is retained somewhat more tenaciously by the alkyl acrylate and alkyl methacrylate polymers than is Propellent 11 even though it boils at a substantially lower temperature than Propellent 11. This is apparently due to the strong associative hydrogen bonding between Propellent 21 and the resin molecules. Accordingly, for the more rapid drying Propellent 11 is preferred.

Propellent 113 is also a solvent for the alkyl acrylate and alkyl methacrylate polymers hereinafter more fully described. However, the relatively high boiling point (117.6° F.) of Propellent 113 is an objectionable property in that it substantially retards the drying rate of the sprayed resin film.

Genetron 142B, a good solvent for the alkyl acrylate and alkyl methacrylate polymers, has a gauge pressure at room temperature of 30 pounds per square inch and boils at +15.1° F. It can, therefore, from the standpoint of pressure be used alone. However, one defect of this particular solvent propellent is its flammable nature, which makes the same generally undesirable for surgical use where any spark or open flame may be encountered.

The vinyl chloride propellent is a good solvent for the alkyl acrylate and alkyl methacrylate polymers. However, the vinyl chloride propellent has the characteristic of being retained more tenaciously by the dissolved with Propellent 11 and non-solvent Propellent 12 to give polymer, after the same has been sprayed into a film in much the same manner as is Propellent 21. It accordingly, gives a much slower drying rate for the polymer film despite the fact that the vinyl chloride boils at +7.0° F. As the vinyl chloride has a gauge pressure of 34 pounds per square inch at 70° F., it can be used alone without a further propellent. However, the flammable nature of the vinyl chloride together with its tendency to be retained by the alkyl acrylate and alkyl methacrylate polymers makes it generally unsuitable for use alone as the propellent solvent in the preferred formulations of the present invention.

Dimethyl ether is another fairly good propellent solvent which is a relatively good solvent for the alkyl acrylate and alkyl methacrylate polymers. The dimethyl ether has a boiling point of −12.7° F. and a gauge pressure at 70° F. of 60 pounds per square inch. However, the dimethyl ether is flammable and has an ethereal odor, both of which properties make it generally unsuitable for surgical purposes when used alone particularly where sparks or open flame may be encountered.

As is clear from the above, the preferred propellent solvent is Propellent 11. The other propellent solvents can, however, be used, particularly where used in blends with Propellent 11. They may also, in some instances, be used without any Propellent 11 being present. However, Propellent 11 is preferred, either as the sole propellent solvent or as the major propellent solvent where blended with any of the other propellent solvents mentioned. The blending of Propellent 11 with vinyl chloride best illustrates some of the advantages obtained by using at least some Propellent 11. Vinyl chloride has been indicated as being flammable and, accordingly, generally undesirable in the preferred compositions. However, the vinyl chloride can be used in minor amounts in blends with Propellent 11 and non-solvent Propellent 12 to give satisfactory nonflammable propellent compositions. For example, the following formulations are nonflammable and give the indicated pressure at 70° F.

| Weight Percent | | | Pressure at 70° F., p.s.i.g. |
| --- | --- | --- | --- |
| Prop. 11 | Prop. 12 | ViCl | |
| 43 | 37 | 20 | 39 |
| 39 | 39 | 22 | 36.5 |
| 45 | 20 | 35 | 34 |
| — | 65 | 35 | 61 |
| — | 80 | 20 | 66 |

Although various propellent blends can be used as long as they contain a solvent propellent and give a pressure of about 20 to 60 pounds per square inch gauge in the pressurized container at a temperature of 75° F., the propellent formulation preferred is 25 to 75 weight percent solvent Propellent 11 and 75 to 25 weight percent non-solvent Propellent 12. In further describing the invention, propellent mixtures consisting of 50 weight percent solvent Propellent 11 and 50 weight percent non-solvent Propellent 12 wil be used.

Propellent solution of film-forming polymer

As previously indicated, I have discovered that alkyl acrylate and alkyl methacrylate polymers are generally soluble in the propellent solvents, heretofore discussed, where the alkyl group contains at least 4 carbon atoms, the larger the alkyl group apparently the more readily soluble the polymer. The homopolymers of both the alkyl acrylates and the alkyl methacrylates are readily soluble as are generally the copolymer of these monomers with other monomers particularly where the alkyl acrylate or alkyl methacrylate is present in the copolymer in amounts of at least 50 percent by weight of the polymer.

The film to be formed may either be a permanently tacky film of the pressure-sensitive adhesive type or a dry protective film covering. This is controlled by the particular polymer or copolymer used. However, satisfactory propellent solutions of the polymer cannot be obtained unless the polymer has a relative viscosity not appreciably above 1.60 and is present in the propellent in a concentration of not appreciably above 6.0%. As a viscosity of at least about 1.1 is needed in order to form a non-liquid film, the viscosity should preferably be within the range of about 1.20 to 1.60.

Among the preferred polymers for practicing the present invention are the copolymers of alkyl acrylate and N-tert.-butylacrylamide.

Where the film-forming polymer used is an alkyl acrylate-N-tert.-butylacrylamide copolymer, the alkyl acrylate content of the copolymer should preferably be at least about 50 percent by weight of the total copolymer. When present in amounts of much less than 50 percent by weight, the copolymer is generally not sufficiently soluble in the solvent propellent. Both 2-ethylhexyl acrylate and n-butyl acrylate, when copolymerized with N-tert.-butylacrylamide, are found to give excellent film-forming resins. The lower alkyl acrylates, such as ethyl or methyl acrylate, when polymerized with N-tert.-butylacrylamide, are generally unsatisfactory, as the copolymers obtained are not sufficiently soluble in the solvent propellent. The alkyl acrylate N-tert.-butylacrylamide copolymers are of low molecular weight, having relative viscosities below 1.60 (1.000 g./100 ml. of toluene solution at 30° C.)

The critical nature of the relative viscosity of the polymer and the concentration of the polymer in the propellent or propellents used are well illustrated by the following table showing the spray characteristics of a copolymer having a ratio of 60% 2-ethylhexyl acrylate and 40% N-tert.-butylacrylamide. The polymer is dissolved in the propellent mixture consisting of 50% Freon 11 and 50% Freon 12. The ingredients are charged into 6-ounce pressure can fitted with a conventional aerosol spray nozzle from which the contents are ejected.

TABLE SHOWING SPRAY CHARACTERISTICS

| Relative Viscosity of Copolymer | Copolymer Concentration | Spray Characteristics |
|---|---|---|
| 2.34 | 2.0 | Wet, jet-like discharge which cobwebs severely; liquid drips from nozzle during discharge. |
| 2.34 | 3.5 | Wet stream; liquid drips from nozzle during discharge. |
| 1.79 | 3.0 | Fine spray with some cobwebbing; liquid drips from nozzle during discharge. |
| 1.79 | 4.5 | Wet, jet-like discharge; much liquid drips from nozzle during discharge. |
| 1.34 | 2.5–3.0 | Finely-atomized, narrow-cone spray; negligible amount of cobwebbing; no liquid drips from nozzle during discharge. |
| 1.34 | 5.0 | Finely-atomized spray with bad cobwebbing; a little liquid drips from nozzle during discharge. |

The following examples given for the purpose of illustration only, will help to further illustrate the practice of the present invention.

Example I

A 1-liter, 3-neck flask is provided with a reflux condenser, a mechanical stirrer, a nitrogen inlet tube, and a thermometer. The flask is charged with 90 grams of 2-ethylhexyl acrylate, 60 grams of N-tert.-butylacrylamide and 226 grams of ethyl acetate. During a 20-minute period the reaction mixture is heated to 75–80° C. and stirred while a slow stream of nitrogen is swept through the apparatus. The flask is heated with an electrically heated oil bath. The N-tert.butylacrylamide dissolves during this heating period. Nitrogen flow is then discontinued, and 0.75 gram of benzoyl peroxide is added. After an induction period of a few minutes, an exothermic polymerization takes place, causing the ethyl acetate to reflux vigorously. This soon subsides, and the reaction mixture, now much thicker, is stirred and heated at 80–85° C. for 3.5 hours. The reaction is then discontinued and the solution cooled to room temperature.

The ethyl acetate is dried from the copolymer by casting the solution in a thin film on silicone-coated paper, then drying at 160° F. The film is flexible, slightly tacky and has a relative viscosity of 2.34.

The copolymer (5.0 grams) is placed in a 6-ounce aerosol can and 161 grams of a 50–50 blend of trichlorofluoromethane and dichlorodifluoromethane is added. The cans are closed with a conventional spray valve to which is attached a polyethylene dip tube. The cans are shaken for several hours at room temperature on a mechanical shaker in order to dissolve the copolymer. The polymer cocentration in this solution is 3 percent. When discharged, the solution is ejected as a wet, liquid stream, showing no tendency to form a finely-atomized spray.

Example II

The polymerization procedure of Example I is repeated using as the polymerization solvent a blend of 113 grams of ethyl acetate and 113 grams of 95 percent ethanol. The copolymer obtained in this case is flexible and slightly tacky as in Example I, but it has a lower molecular weight as shown by the relative viscosity value of 1.34. Five grams of this copolymer, dissolved in 161 grams of a 50–50 blend of trichlorofluoromethane and dichlorodifluoromethane, produced a 3 percent solution which sprayed well in the form of a finely atomized aersol cone. A rapidly drying skin adherent film is formed when sprayed onto the skin. When the concentration of the copolymer in the fluorocarbons is raised to 8 percent (14.0 grams of copolymer in 161 grams of fluorocarbons), the solution discharges from the valve as a poorly dispersed, wet stream which coalesces into "cobwebs" of copolymer as the propellents evaporate.

Example III

The polymerization procedure of Example I is repeated using 112.5 grams of 2-ethylhexyl acrylate and 37.5 grams of N-tert.-butylacrylamide in 226 grams of ethyl acetate. The copolymer obtained is a tacky, pressure-sensitive adhesive having a relative viscosity of 2.06. A 3 percent solution of this copolymer in 50–50 trichlorofluoromethane and dichlorofluoromethane is discharged from the valve as a wet, jet-like stream rather than as a spray.

Example IV

The polymerization procedure of Example I is repeated using 112.5 grams of 2-ethylhexyl acrylate and 37.5 grams of N-tert.-butylacrylamide in 113 grams of ethyl acetate and 113 grams of 95% ethanol. The tacky, pressure-sensitive copolymer obtained has a relative viscosity of 1.32. A 3 percent solution of this copolymer in the fluorocarbon blend forms a finely atomized spray as it comes out of the aerosol valve. A rapidly drying skin adherent film is formed when sprayed onto the skin. The same copolymer at a concentration of 8 percent discharges as a coarse, wet stream which "cobwebs" severely.

Example V

The polymerization procedure of Example I is repeated using 90 grams of n-butyl methacrylate and 40 grams of N-tert.-butylacrylamide in 113 grams of ethyl acetate and 113 grams of 95% ethanol. The copolymer obtained is non-tacky and somewhat brittle, having a relative viscosity of 1.45. A 3 percent solution in a 50–50 blend of trichlorofluoromethane and dichlorodifluoromethane provides a coarse aerosol spray. A rapidly drying skin adherent film is formed when sprayed onto the skin. A 7 percent solution discharges as a wet jet-like stream.

Example VI

Five solutions are prepared in aerosol cans closed with spray valves. Each of these contains 3 weight percent of the copolymer of Example II (relative viscosity, 1.34) and one of the following propellent compositions.

| No.: | Propellent Composition |
|---|---|
| 1 | 90% vinyl chloride-10% trichlorofluoromethane. |
| 2 | 100% 1-chloro-1,1-difluoroethane. |
| 3 | 60% dichlorofluoromethane - 40% dichlorodifluoromethane. |
| 4 | 50% 1,1,2-trichloro-1,2,2-trifluoroethane-50% dichlorodifluoromethane. |
| 5 | 100% dimethyl ether. |

When discharged through the aerosol valve, each of the five solutions produced a spray similar in appearance and fineness to that obtained with the 3 percent solution in 50–50 trichlorofluoromethane and dichlorodifluoromethane.

Particular embodiments of the invention have been used to illustrate the same. The invention, however, is not limited to these specific embodiments. In view of the foregoing disclosure, variations or modifications thereof will be apparent, and it is intended to include within the invention all such variations and modifications except as do not come within the scope of the appended claims.

Having thus described my invention, I claim:

1. In a pressurized system for spray application a solution of a film-forming polymer in propellent said film-forming polymer being at least one of the group consisting of homopolymers and copolymers of alkyl acrylates and homopolymers and copolymers of alkyl methacrylates wherein the alkyl group has at least four carbon atoms and wherein said polymer has a relative viscosity of not over 1.60 said polymer being present in said solution in a concentration of not over 6.0% and said propellant containing at least one propellant solvent of the group consisting of trichlorfluoromethane, dichlorodifluoromethane, 1,1,2-trichloro-1,2,2-difluoroethane, 1,1-difluoro-1-chloroethane, vinyl chloride and dimethyl ether, the solvent for said film-forming polymer in said pressurized system consisting essentially of said propellent solvent and said pressurized system containing no other solvent for said film-forming polymer in amounts sufficient to completely dissolve said film-forming polymer in the absence of said propellent solvent.

2. A pressurized system of claim 1 in which the major portion of the propellent solvent is trichlorofluoromethane.

3. In a pressurized system for spray application a solution of a film-forming polymer in propellent, said film-forming polymer comprising an alkyl acrylate having polymerized therewith at least one monomer of the group consisting of n-butyl methacrylate and N-tert.-butylacrylamide, the alkyl group of said alkyl acrylate containing at least four carbon atoms, said polymer having a relative viscosity of not more than about 1.6 and said polymer being present in said solution in an amount of not over 6.0 percent by weight of said solution and said propellent containing at least one propellent solvent of the group consisting of trichlorofluoromethane, dichlorodifluoromethane, 1,1,2 - trichloro-1,2,2-difluoroethane, 1,1-difluoro-1-chloroethane, vinyl chloride and dimethyl ether the solvent for said film-forming polymer in said pressurized system consisting essentially of said propellent solvent and said pressurized system containing no other solvent for said film-forming polymer in amounts sufficient to completely dissolve said film-forming polymer in the absence of said propellent solvent.

4. A pressurized system of claim 3 in which the monomer of said group is n-butyl methacrylate and in which said alkyl acrylate is present in said polymer in an amount of at least 50 percent by weight.

5. A pressurized system of claim 4 in which the major portion of propellent solvent is trichlorofluoromethane.

6. A pressurized system of claim 3 in which the monomer of said group is N-tert.-butylacrylamide and in which said alkyl acrylate is present in said polymer in an amount of at least 50 percent by weight.

7. A pressurized system of claim 6 in which the major portion of propellent solvent is trichlorofluoromethane.

8. In a pressurized system for spray application a solution of a film-forming polymer in propellent said film-forming polymer comprising an alkyl methacrylate having polymerized therewith at least one monomer of the group consisting of n-butyl methacrylate and N-tert.-butylacrylamide, the alkyl group of said alkyl acrylate containing at least four carbon atoms, said polymer having a relative viscosity of not more than about 1.6 and said polymer being present in said solution in an amount of not over 6.0 percent by weight of said solution and said propellent containing at least one propellent solvent of the group consisting of trichlorofluoromethane, dichlorodifluoromethane, 1,1,2-trichloro-1,2,2-difluoroethane, 1,1-difluoro-1-chloroethane, vinyl chloride and dimethyl ether, the solvent for said film-forming polymer in said pressurized system consisting essentially of said propellent solvent and said pressurized system containing no other solvent for said film-forming polymer in amounts sufficient to completely dissolve said film-forming polymer in the absence of said propellent solvent.

9. A pressurized system of claim 8 in which the monomer of said group is n-butyl methacrylate and in which said alkyl acrylate is present in said polymer in an amount of at least 50 percent by weight.

10. A pressurized system of claim 9 in which the major portion of propellent solvent is trichlorofluoromethane.

11. A pressurized system of claim 8 in which the monomer of said group is N-tert.-butylacrylamide and in which said alkyl acrylate is present in said polymer in an amount of at least 50 percent by weight.

12. In a pressurized system for spray application a solution of a film-forming polymer in propellent, said film-forming polymer comprising a copolymer of 2-ethylhexyl acrylate with a monomer of the group consisting of n-butyl methacrylate and N-tert.-butylacrylamide said 2-ethylhexyl acrylate comprising at least 50 percent by weight of said polymer, said polymer having a relative viscosity of not more than about 1.6 and said polymer being present in said solution in an amount of not over 6.0 percent by weight and said propellent containing at least one propellent solvent of the group consisting of trichlorofluoromethane, dichlorodifluoromethane, 1,1,2-trichloro - 1,2,2 - difluoroethane, 1,1-difluoro-1-chloroethane, vinyl chloride and dimethyl ether, the solvent for said film-forming polymer in said pressurized system consisting essentially of said propellent solvent and said pressurized system containing no other solvent for said film-forming polymer in amounts sufficient to completely dissolve said film-forming polymer in the absence of said propellent solvent.

13. A pressurized system of claim 12 in which the major portion of propellent solvent is trichlorofluoromethane.

14. A pressurized system of claim 13 in which the propellent consists of 25 to 75 parts by weight trichlorofluoromethane and 75 to 25 parts by weight dichlorodifluoromethane.

References Cited
UNITED STATES PATENTS

| | | | |
|---|---|---|---|
| 3,025,219 | 3/1962 | Maeder | 260—33.4 |
| 3,026,250 | 3/1962 | Coymer | 260—33.4 |
| 2,617,780 | 11/1952 | Lutz | 260—33.8 |
| 2,897,172 | 7/1959 | Maeder | 260—33.8 |
| 3,062,751 | 11/1962 | Wahlin | 167—82 |

ALLAN LIEBERMAN, *Primary Examiner.*

L. T. JACOBS, *Assistant Examiner.*

UNITED STATES PATENT OFFICE
CERTIFICATE OF CORRECTION

Patent No. 3,413,254  November 26, 1968

Robert J. Gander

It is certified that error appears in the above identified patent and that said Letters Patent are hereby corrected as shown below:

Column 2, line 24, "aobut" should read -- about --. Column 3, line 8, "Propelelnt" should read -- Propellent --; line 44, cancel "with Propellent 11 and non-solvent Propellent 12 to give". Column 5, line 55, "cocentration" should read -- concentration --; line 70, "aersol" should read -- aerosol --.

Signed and sealed this 10th day of March 1970.

(SEAL)
Attest:

Edward M. Fletcher, Jr.  WILLIAM E. SCHUYLER, JR.
Attesting Officer  Commissioner of Patents